(12) United States Patent
Lida

(10) Patent No.: US 8,565,259 B2
(45) Date of Patent: Oct. 22, 2013

(54) METHOD AND SYSTEM FOR DIRECTION SETTING OF A SELF-CONFIGURABLE ASYMMETRIC LINK

(75) Inventor: Eyran Lida, Kfar Ha-Oranim (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 166 days.

(21) Appl. No.: 13/106,800

(22) Filed: May 12, 2011

(65) Prior Publication Data

US 2011/0222422 A1 Sep. 15, 2011

Related U.S. Application Data

(63) Continuation of application No. 13/129,111, filed as application No. PCT/US2009/064638 on Nov. 16, 2009.

(60) Provisional application No. 61/115,099, filed on Nov. 16, 2008.

(51) Int. Cl.
*H04L 12/66* (2006.01)
*H04J 3/16* (2006.01)

(52) U.S. Cl.
USPC .................... 370/463; 370/252; 370/437

(58) Field of Classification Search
USPC ......... 370/252–254, 400, 401, 406–409, 431, 370/436, 437, 463, 468
See application file for complete search history.

(56) References Cited

U.S. PATENT DOCUMENTS

| | | | |
|---|---|---|---|
| 5,909,463 A | 6/1999 | Johnson | |
| 5,960,036 A | 9/1999 | Johnson | |
| 6,104,727 A | 8/2000 | Moura | |
| 6,424,636 B1 | 7/2002 | Seazholtz | |
| 6,498,939 B1 * | 12/2002 | Thomas | 455/562.1 |
| 6,640,239 B1 | 10/2003 | Gidwani | |
| 6,704,327 B1 * | 3/2004 | Gardner et al. | 370/467 |
| 6,728,205 B1 * | 4/2004 | Finn et al. | 370/217 |
| 7,403,519 B2 | 7/2008 | Huang | |
| 8,290,036 B2 | 10/2012 | Sackstein et al. | |
| 2002/0041571 A1 | 4/2002 | Huff | |
| 2003/0182548 A1 | 9/2003 | Xiong et al. | |
| 2003/0206564 A1 | 11/2003 | Mills et al. | |
| 2004/0151131 A1 | 8/2004 | Schneider et al. | |
| 2005/0152517 A1 | 7/2005 | Binder | |
| 2005/0160212 A1 | 7/2005 | Caruk | |
| 2008/0175587 A1 | 7/2008 | Jensen | |
| 2008/0186892 A1 * | 8/2008 | Damnjanovic | 370/311 |
| 2010/0131991 A1 | 5/2010 | Tao | |

OTHER PUBLICATIONS

PCT/US2009/064638, International Preliminary Report on Patentability, May 17, 2011.

* cited by examiner

*Primary Examiner* — Kerri Rose

(57) ABSTRACT

A network including two networking devices connected via a self-configurable asymmetric link. The networking devices connect multimedia sink and source devices. And the networking devices further set the direction of the self-configurable asymmetric link based on a function describing the desired connections between the multimedia sink and multimedia source devices. Also disclosed a network comprising two networking devices connected via a self-configurable asymmetric link. The networking devices configured to connect multimedia sink and source devices. And the networking devices set the direction of the self-configurable asymmetric link based on the usage statistics of the self-configurable asymmetric link.

25 Claims, 13 Drawing Sheets

METHOD AND SYSTEM FOR DIRECTION SETTING OF A SELF-CONFIGURABLE ASYMMETRIC LINK

CROSS-REFERENCE TO RELATED APPLICATIONS

This application is a continuation of U.S. application Ser. No. 13/129,111, filed May 12, 2011, which is a National Stage of International Application No. PCT/US09/64638, filed Nov. 16, 2009, which claims the benefit under 35 U.S.C. 119(e) of U.S. Provisional Patent Application No. 61/115,099, filed Nov. 16, 2008, the entire contents of which are herein incorporated by reference.

BACKGROUND

In telecommunications, the term asymmetric communication link refers to a communication link in which the data speed or quantity differs in one direction as compared with the other direction. Asymmetric data flow can, in some instances, make more efficient use of the available resources than symmetric data flow, in which the speed or quantity of data is the same in both directions. Asymmetric Digital Subscriber Line (ADSL) is an example of asymmetric communication link. Complete theoretical descriptions, details, explanations, examples, and applications of these, and related subjects and phenomena are readily available in standard references in the field of communications.

BRIEF SUMMARY

In one embodiment, a network comprising two networking devices connected via a self-configurable asymmetric link. The networking devices configured to connect multimedia sink and multimedia source devices. And the networking devices further configured to set direction of the self-configurable asymmetric link based on a function describing desired connections between the multimedia sink and multimedia source devices.

In one embodiment, a method for setting the direction of a self-configurable asymmetric link based on end-devices communicating via the self-configurable asymmetric link, the method comprising the following steps: Obtaining a list of the end-devices communicating via the self-configurable asymmetric link. And setting the direction of the self-configurable asymmetric link to maximize a predefined function describing desired connections between the end-devices.

In one embodiment, a network comprising two networking devices connected via a self-configurable asymmetric link. The networking devices configured to connect multimedia sink and multimedia source devices. The networking devices further configured to set direction of the self-configurable asymmetric link based on usage statistics of the self-configurable asymmetric link.

In one embodiment, a method for setting the direction of a self-configurable asymmetric link according to usage statistics, comprising the following steps: Obtaining usage statistics of a network comprising multimedia end-devices and two networking devices, wherein the networking devices are connected by a self-configurable asymmetric link. And setting the direction of the self-configurable asymmetric link based on the usage statistics of the network.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
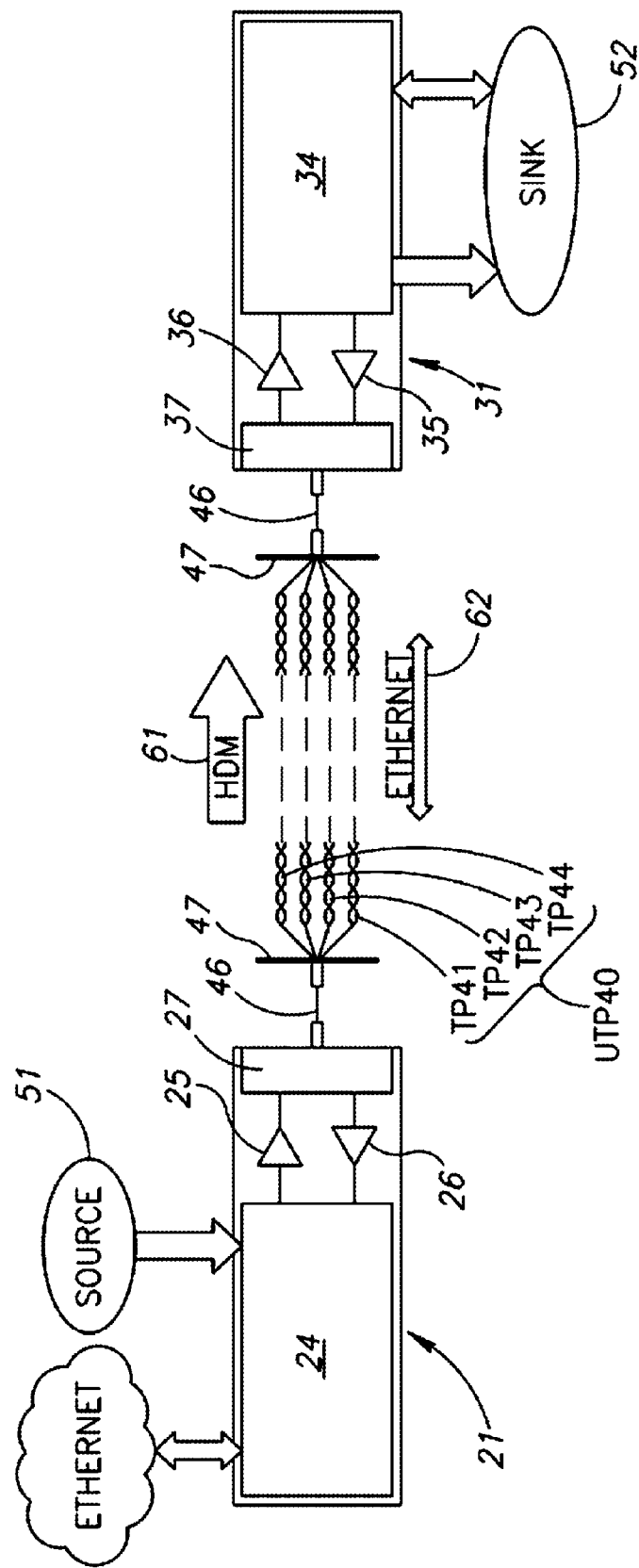
FIGS. 1A-1D illustrate communication links for different types of data over the same wires, in accordance with one embodiment of the present invention.
Figure 1B:
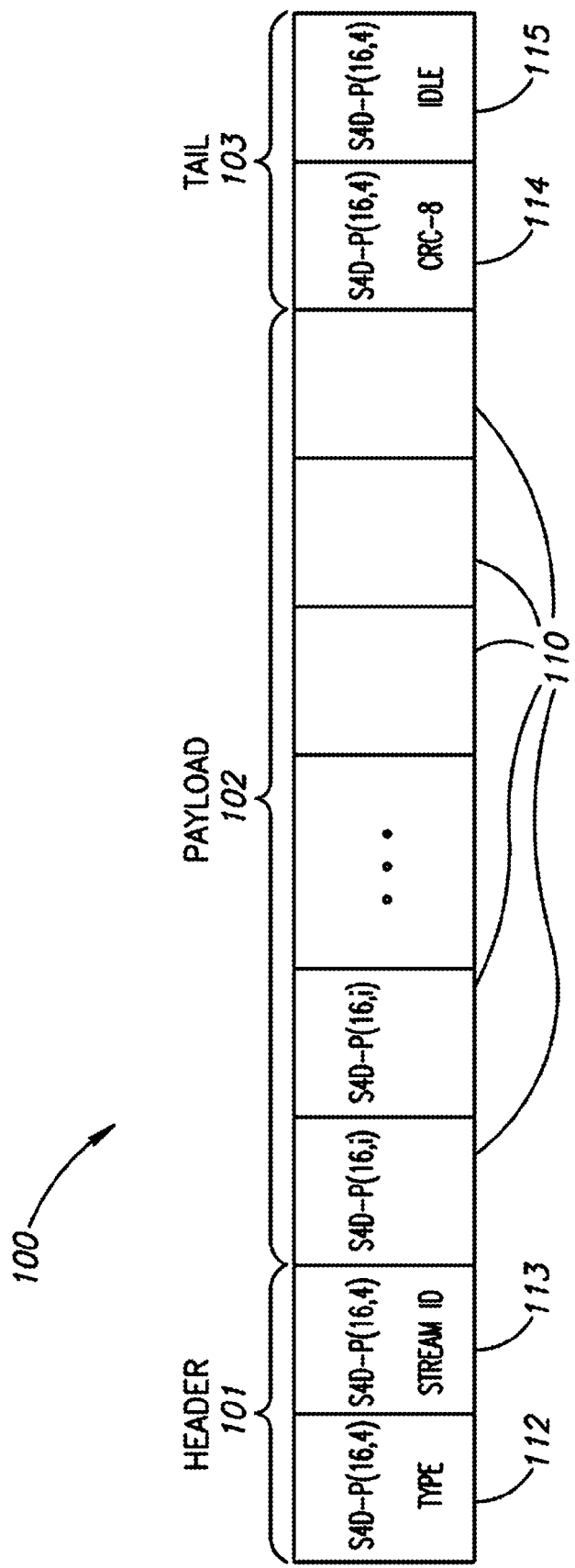
Figure 1C:
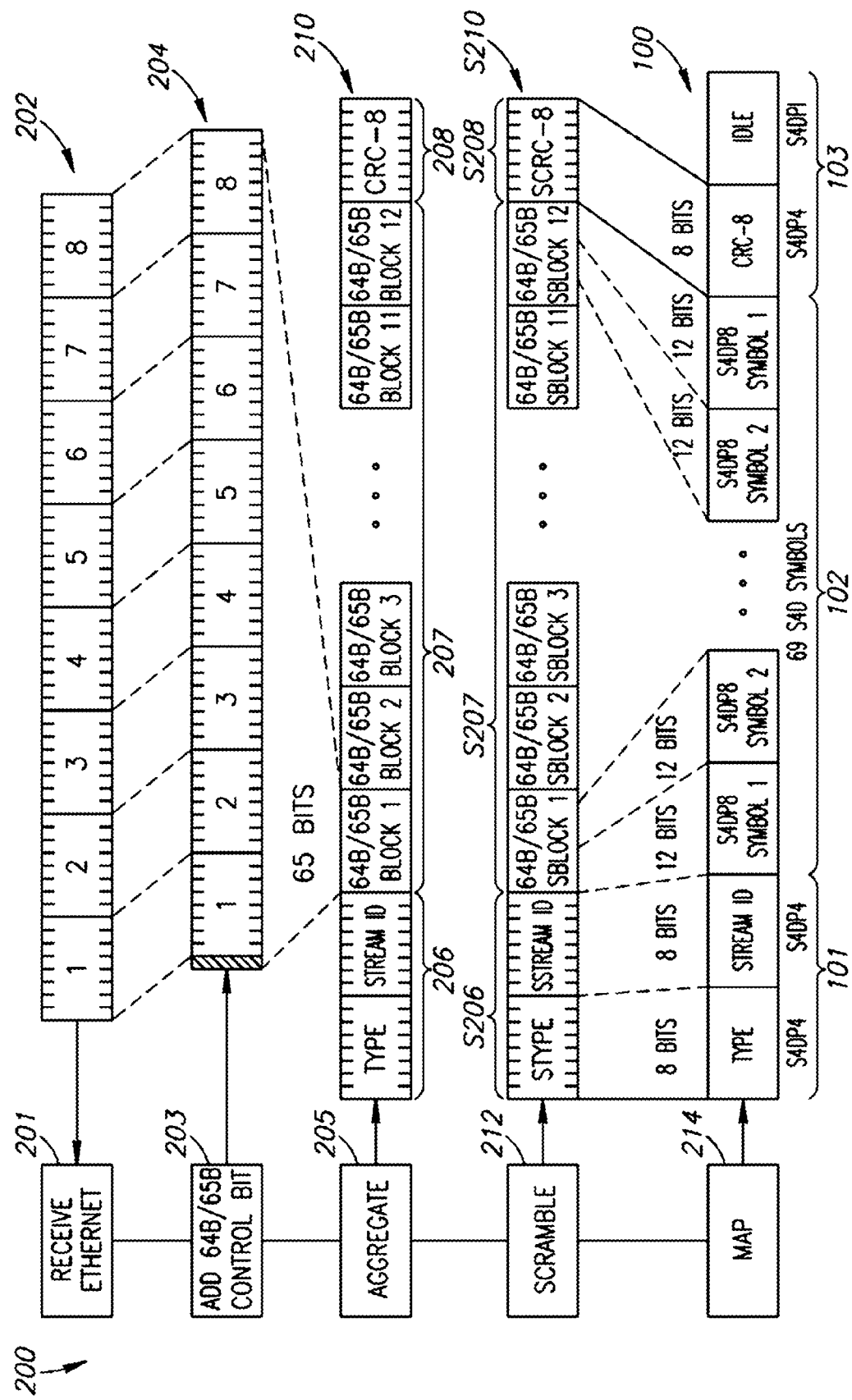
Figure 1D:
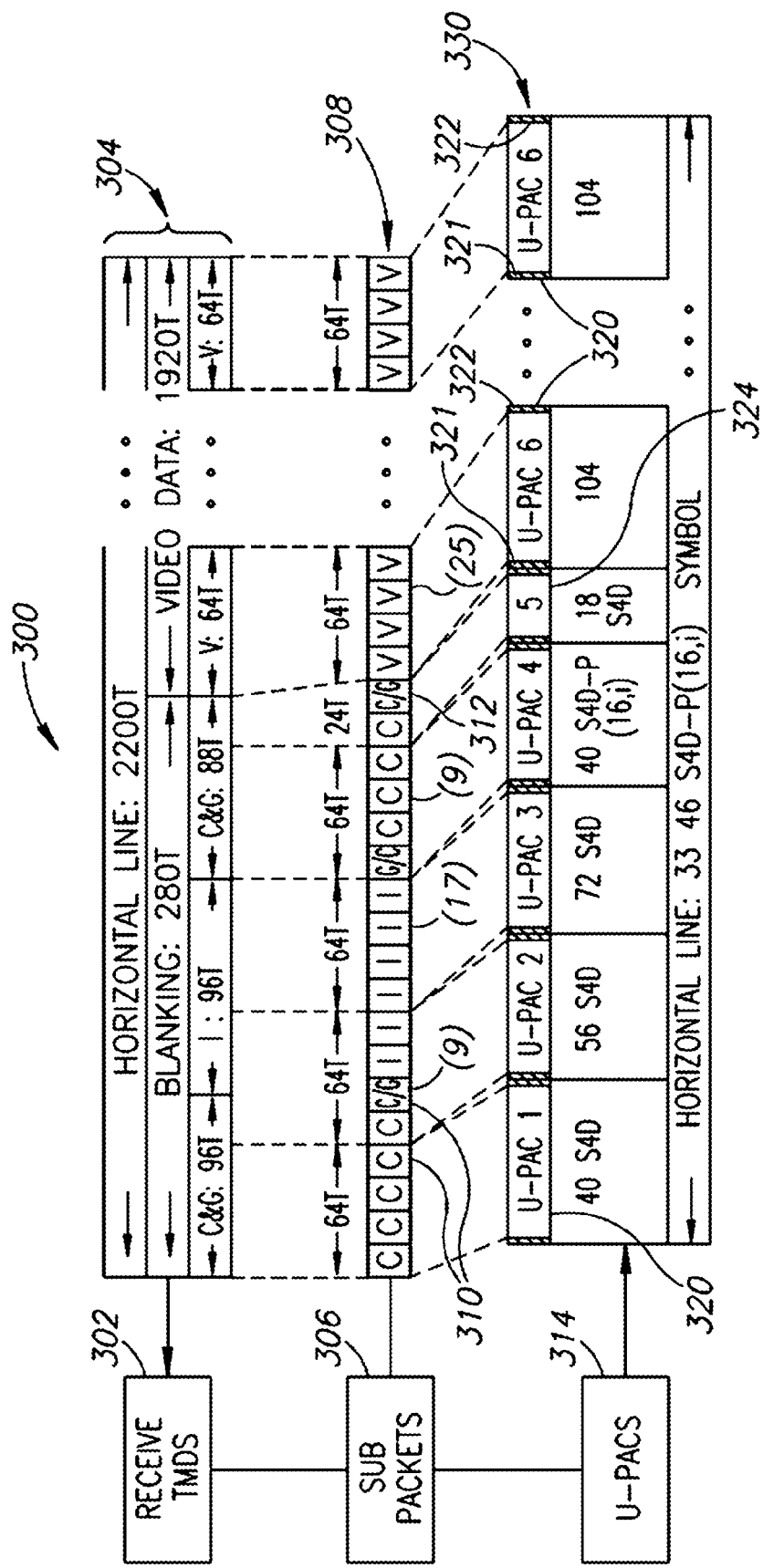

In the following description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" or "an embodiment" mean that the feature being referred to may be included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some operations in the flow diagrams may be described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. Furthermore, methods and mechanisms of the embodiments will sometimes be described in singular form for clarity. However, it should be noted that some embodiments may include multiple iterations of a method or multiple instantiations of a mechanism unless noted otherwise. For example, when a controller or an interface are disclosed in an embodiment, the scope of the embodiment is intended to also cover the use of multiple controllers or interfaces.

Figure 2A:
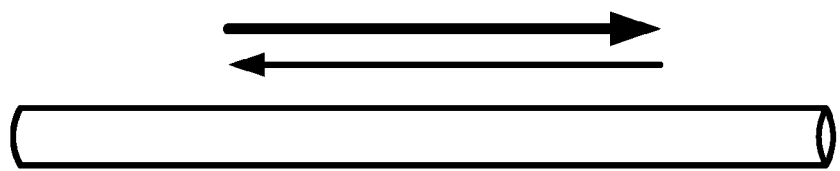
FIG. 2A illustrates an asymmetric communication link, in accordance with one embodiment of the present invention.

FIG. 2A illustrates an asymmetric communication link. The term "asymmetric communication link" as used herein refers to a full-duplex communication link featuring high throughput communication in one direction and lower throughput communication in the other direction. For example, HDMI and DisplayPort are full-duplex asymmetric communication links featuring high throughput communication comprising video, audio, and data in one direction, and low throughput bidirectional data communication.

Figure 2B:
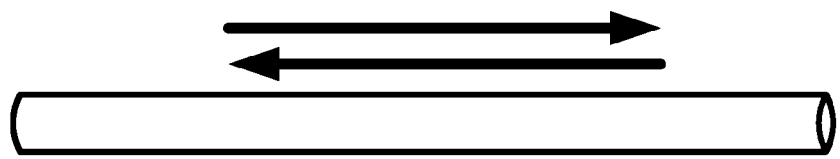
FIG. 2B illustrates a symmetric communication link, in accordance with one embodiment of the present invention.

FIG. 2B illustrates a symmetric communication link. The term "symmetric communication link" refers to a communication link featuring high throughputs in both directions, simultaneously. For example, an Ethernet communication link is a symmetric communication link.

Figure 2C:
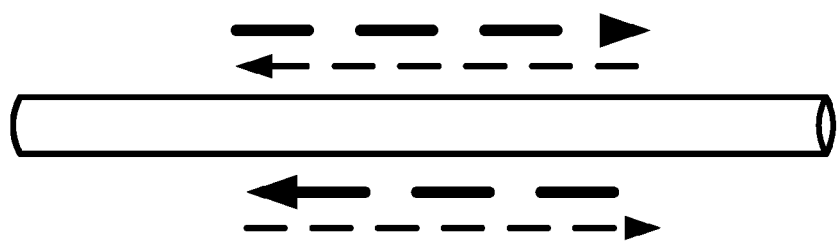
FIG. 2C illustrates a self-configurable asymmetric link, in accordance with one embodiment of the present invention.

FIG. 2C illustrates a self-configurable asymmetric link. The term "self-configurable asymmetric link" as used herein refers to a communication link capable of transmitting either a high throughput in a first direction and a lower throughput in the second direction, or a high throughput in the second direction and a lower throughput in the first direction. In some embodiments, the self-configurable asymmetric link may also have a manual configuration mode.

The term "high throughput" generally refers to a throughput higher than 1.1 Gbps, while the term "low throughput" or "lower throughput" refers to a throughput which is, at the most, one third of the "high throughput". For example, the high throughput may range from approximately 0.5 Gbps to approximately 20 Gbps, while the lower throughput may range from approximately 1 Kbps to approximately 5 Gbps.

The term "asymmetric communication port" also covers full-duplex asymmetric wireless connection. For example, the phrase "a switch comprising at least two asymmetric communication ports" also covers a full-duplex wireless switch comprising at least two full-duplex asymmetric wireless connections.

The term "networking device" as used herein refers to a device that mediates data in a computer/multimedia network, such as, but not limited to, a switch, a gateway, a router, a bridge, a hub, a daisy-chain device, and/or a repeater.

The term "wired switch" is to be interpreted as a non-wireless switch, such as a switch having any kind of port designed for conductive wires and/or fiber optics. In the claims, the term "self-configurable wired asymmetric link" is to be interpreted as a non-wireless self-configurable asymmetric link, such as a conductive self-configurable asymmetric link, or a fiber optics self-configurable asymmetric link.

FIG. 1A-1D illustrate communication links for different types of data over the same wires, as discussed in U.S. patent application Ser. No. 11/703,080, which is incorporated herein by reference.

Figure 3:
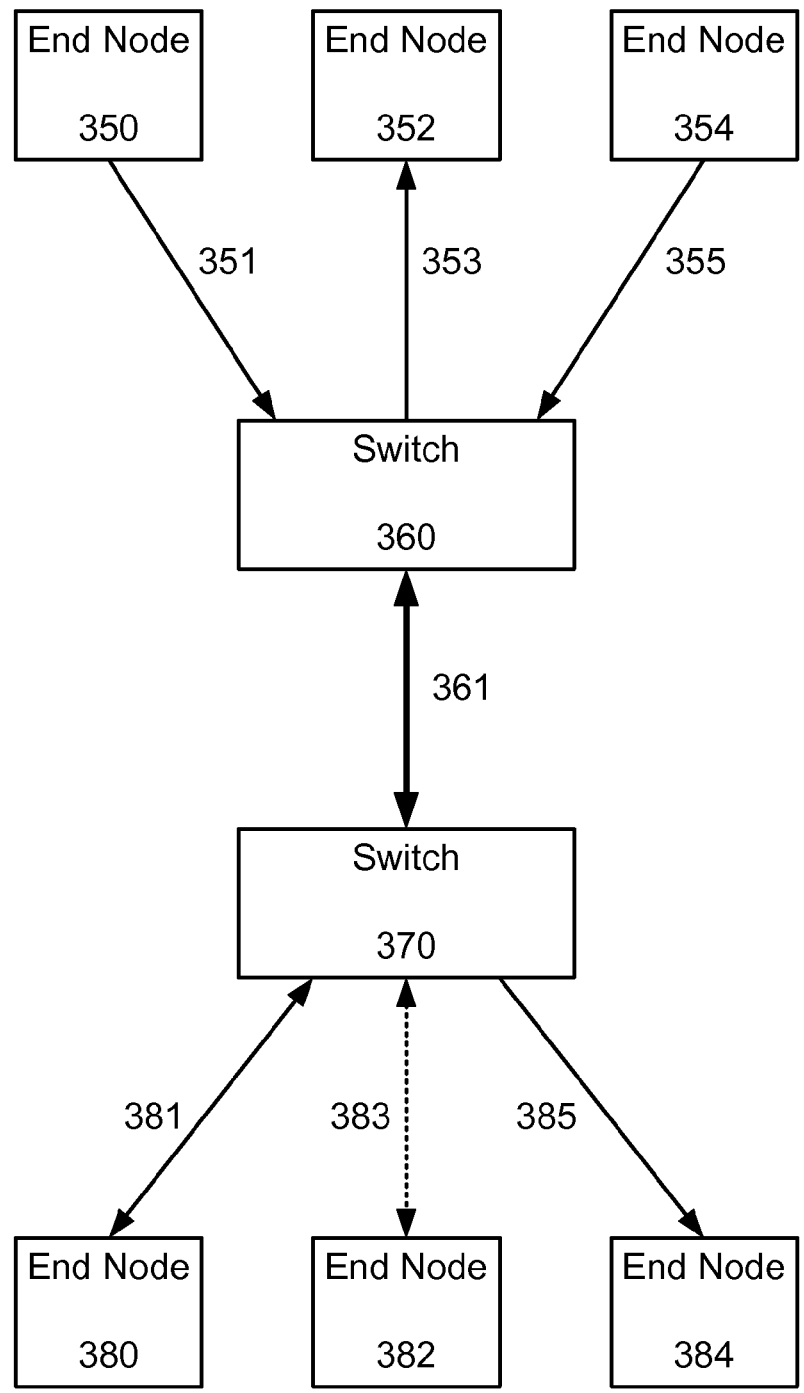
FIG. 3 illustrates a network, in accordance with one embodiment of the present invention.
Figure 4:
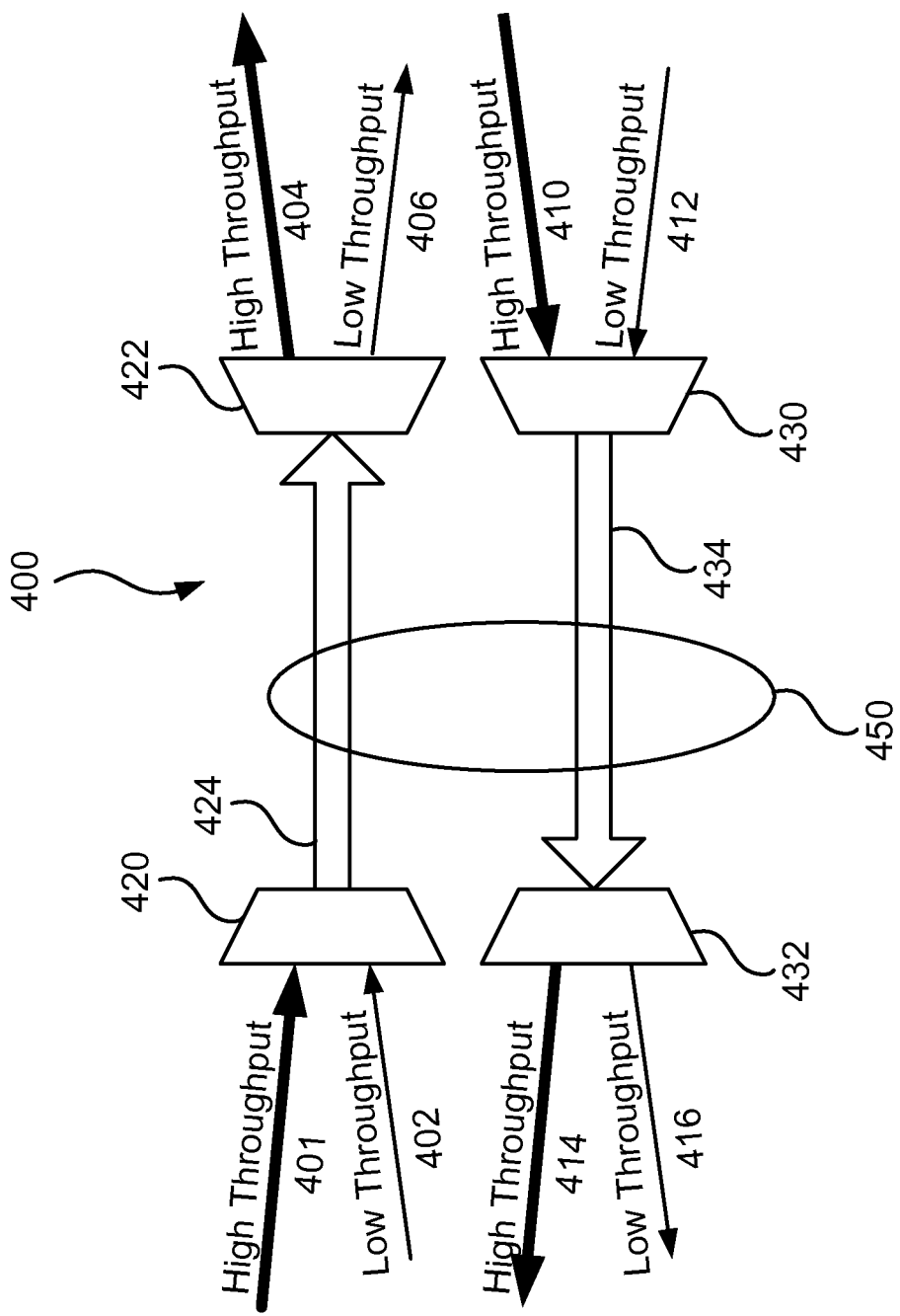
FIG. 4 illustrates a symmetric communication link over the same wires, in accordance with one embodiment of the present invention.

FIG. 3 illustrates a network comprising asymmetric communication links (351, 353, 355, and 385), a self-configurable asymmetric link 383, and symmetric communication links 361 and 381. In one embodiment, the asymmetric communication links connect asymmetric devices, such as multimedia sinks, multimedia sources, printers, or certain storage devices; the self-configurable asymmetric links may connect asymmetric devices or self-configurable asymmetric devices; and the symmetric ports may communicate with asymmetric devices, self-configurable asymmetric devices, or symmetric devices.

The hybrid system illustrated by FIG. 3 may provide a cost-effective solution for a network comprising asymmetric devices and symmetric and/or self-configurable asymmetric devices.

Self-configurable asymmetric devices are devices that set a connection in a first direction and thereafter can reverse the direction. Non-limiting examples of such devices include switches that can reverse the link direction upon request, and a device that can act both as a video source and as a video sink, such as a first television having a tuner that is able to transmit uncompressed video to a second television, which may not have a tuner.

Referring to switch 360, the ports coupled to the asymmetric links (351, 353, and 355) may be asymmetric communication ports, self-configurable asymmetric ports, or symmetric ports. A solution where the ports coupled to the asymmetric links are asymmetric communication ports may be the least expensive solution, but it should comprise some designated ports for sink devices, and some designated ports for source devices. A solution where the ports coupled to the asymmetric links are symmetric ports provides the highest flexibility, but may be expensive. A solution where some or all of the ports coupled to the asymmetric links are self-configurable asymmetric ports may provide similar flexibilities to those provided by the symmetric solution, at a reasonable cost. For example, a solution comprising self-configurable asymmetric ports may utilize the same ports for all asymmetric links, and does not have to include some designated ports for sink devices and some designated ports for source devices.

In one embodiment, the communication link between switches, such as communication link 361, is a symmetric communication link or a self-configurable asymmetric link.

A Self-Configurable Asymmetric Link

In one embodiment, the self-configurable asymmetric link is implemented over the same cable. In another embodiment, the self-configurable asymmetric link is implemented over a plurality of wires coupled to a single connector (at least at one of the ends). In another embodiment, the self-configurable asymmetric link is implemented over a wireless channel. Herein, the directionality of the self-configurable asymmetric link is determined by the direction of the high throughput stream.

Figure 5:
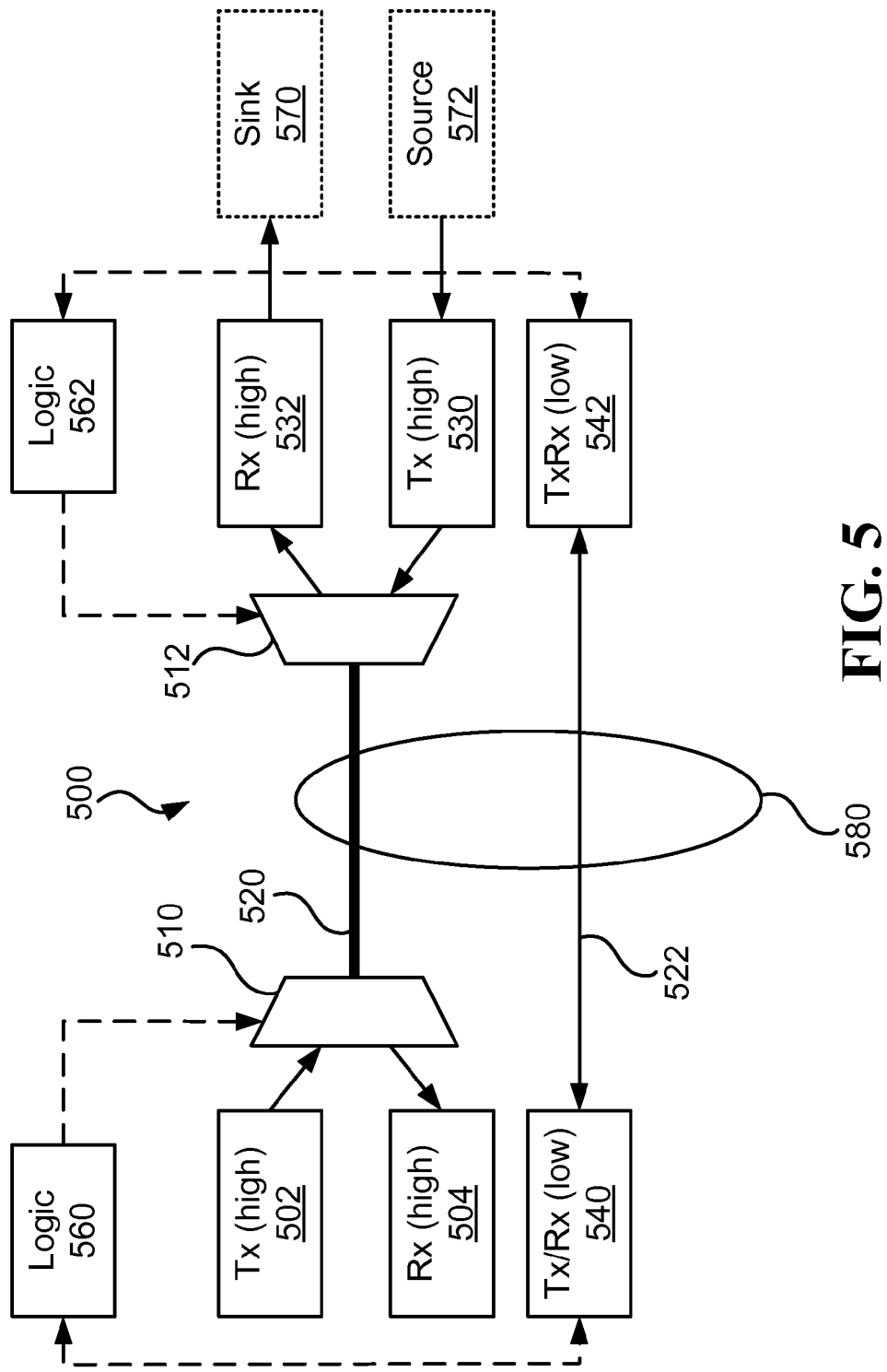
FIG. 5 illustrates a self-configurable asymmetric link, in accordance with one embodiment of the present invention.

FIG. 5 is a schematic illustration of a self-configurable asymmetric link, wherein the high throughput communication is transmitted over a first medium 520, and the lower throughput communication is transmitted over a second medium 522. Optionally, the first medium and the second medium are in the same cable. Optionally, the first medium and the second medium are coupled to the same connectors at the ends of the cable.

Logics 560 and 562, may operate using a master-slave scheme, may feature equal importance, may use a distributed decision scheme, may be implemented by the same logic, or may communicate with one another to coordinate their operation. Logics 560 and 562 may manage the high throughput channel and the lower throughput channel coordinately. Optionally, logic 560 determines whether transmitter 502 or receiver 504 should be operated, and routes the signals to/from the selected device utilizing selector 510. Simultaneously, logic 562 determines whether transmitter 530 or receiver 532 should be operated, and routes the signals to/from the selected device utilizing selector 512. Both ends of the communication link are operated coordinately, meaning that the logics operate transmitter 502 with receiver 532, or operate transmitter 530 with receiver 504.

Optionally, logics 560 and 562 manage the lower throughput bidirectional channel 522 by setting transceivers 540 and 542 according to the required behavior, which may be a function of the high throughput communication link's behavior. In one embodiment, the lower throughput bidirectional channel 522 is a symmetric channel.

In one embodiment, the self-configurable asymmetric link transfers multimedia. In this case, logics 560 and 562 determine which side operates as the source and which side operates as the sink. In one example, communication link 500 transfers an HDMI-TMDS stream from transmitter 502 to receiver 532. In order for the HDMI controls to be transferred over the lower throughput bidirectional channel 522, logic 560 sets transceiver 540 to be the I2C slave of its source device (not illustrated in the figure), and sets transceiver 542 to be the I2C master of its sink device 570.

Optionally, logics 560 and 562 also manage the devices coupled to the communication link. For example, while transmitting from transmitter 530 to receiver 504, logic 562 may connect source device 572 to transmitter 530 and disconnect sink device 570 from receiver 532. Similarly, while transmitting from transmitter 502 to receiver 532, logic 562 may connect sink device 570 to receiver 532 and disconnect source device 572 from transmitter 530.

In FIG. 5, the unidirectional high throughput stream and the bidirectional lower throughput stream are transferred over different mediums. Therefore, it is possible to have continuous communication over the lower throughput channel while changing the communication properties over the high throughput channel. In one embodiment, the changes over the high throughput channel are negotiated using messages communicated over the lower throughput channel, which may operate continuously while the changes occur.

Managing a Self-Configurable Asymmetric Link

Initializing and/or changing the directionality of the self-configurable asymmetric link may be implemented using one of the following embodiments or using any other embodiment leading to a similar end result.

In one embodiment, the self-configurable asymmetric link is initialized in a bidirectional lower-throughput mode. Then the linked devices are able to negotiate with each other and determine the mode of operation.

Figure 6:
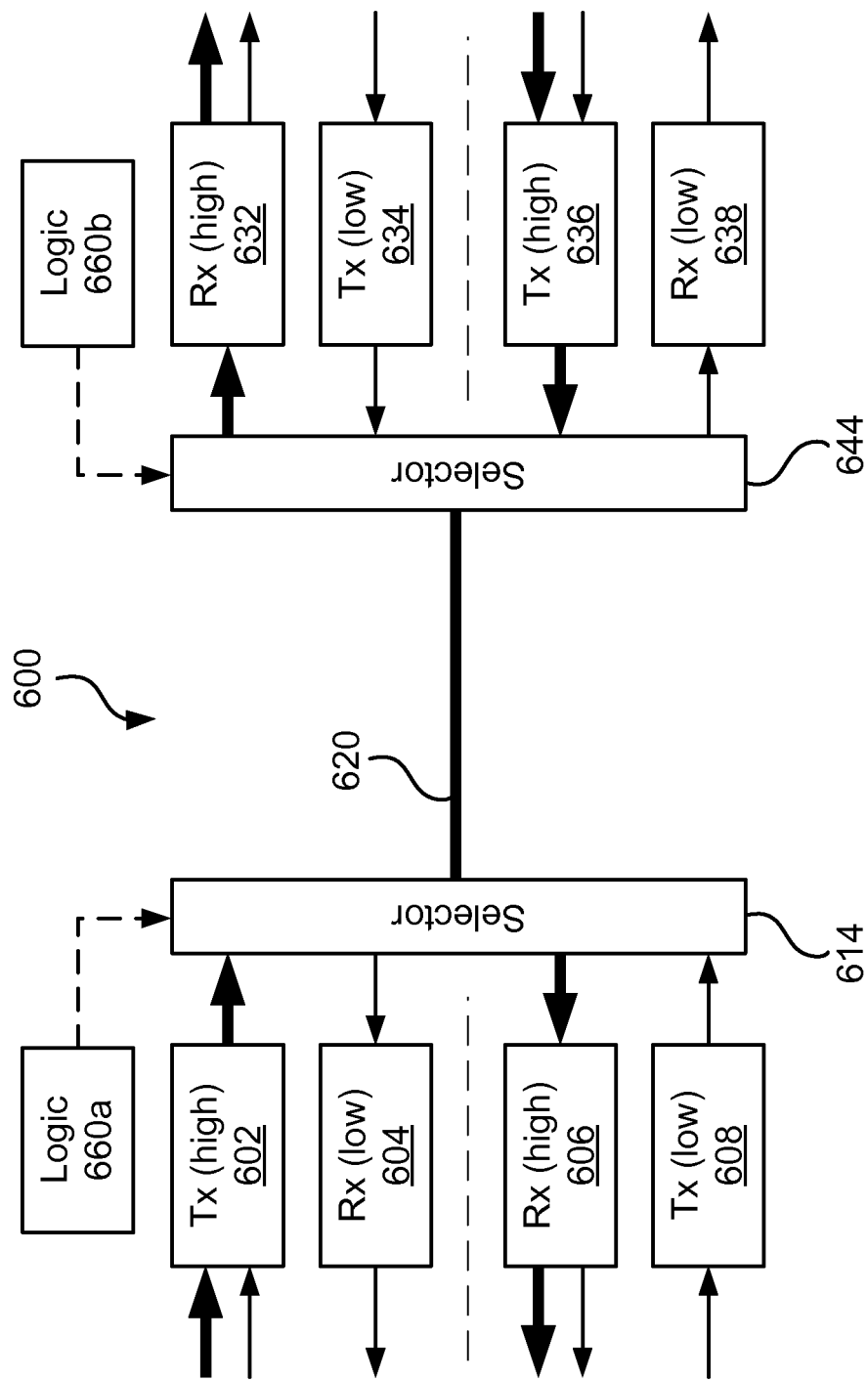
FIG. 6 illustrates a self-configurable asymmetric link, in accordance with one embodiment of the present invention.

FIG. 6 is a schematic illustration of a self-configurable asymmetric link, wherein the high throughput communication and the lower throughput communication are transmitted over the same wires 620.

In the case where the link directionality is from left to right, transmitter 602 receives and multiplexes the high and low throughput streams; receiver 632 receives the multiplexed stream of the high and low throughput streams and demultiplexes it to the high and the low throughput streams; transmitter 634 transmits the low throughput stream; and receiver 604 receives the low throughput stream. Similarly, in the case where the link directionality is from right to left, transmitter 636 receives and multiplexes the high and low throughput streams; receiver 606 receives the multiplexed stream of the high and low throughput streams, and demultiplexes it to the high and the low throughput streams; transmitter 608 transmits the low throughput stream; and receiver 638 receives the low throughput stream.

Selectors 614 and 644, optionally operated by logics 660a and 660b, determine whether transmitters 602, 634 and receivers 604, 632 should be coupled to the medium 620, or transmitters 608, 636 and receivers 606, 638 should be coupled to the medium 620.

In one embodiment, the analog front-ends, which couple the transmitters and receivers to the medium 620, support the operation of the various transmitters and receivers. For example, the analog front-ends support the high throughput transmitter, the low throughput transmitter, the high throughput receiver, and the low throughput receiver.

When the high and low throughput communications are transmitted over the same wires 620, all communications, including the low throughput communication, may stop upon changing the mode of operation of communication link 600. Examples of changing the mode of operation include changing the directionality of the link, and/or changing certain properties of the link, such as the rate or level of protection against noise.

In one embodiment, the communication link 600 has a low power partial functionality mode of operation, as discussed, for example, in U.S. patent application publication No. US2008/0291994, entitled "Low power partial functionality communication link", which is incorporated herein by reference and discloses a bidirectional low power mode of operation that enables the elements coupled to the communication link to send and receive messages and negotiate the required mode of operation. In one embodiment, changing the link's mode of operation may comprise the steps of: switching to a low power partial functionality mode of operation; negotiating the next mode of operation; and switching to the next mode of operation. In another embodiment, changing the link's mode of operation may comprise the steps of negotiating the next mode of operation and switching to the next mode of operation.

In one embodiment, before reversing the link directionality, the active high throughput receiver, which has already solved the channel response and holds the channel properties (which include the channel coefficients), forwards the channel properties to the second high throughput receiver on the other side of the communication link. And because some of the physical characteristics of the communication link are symmetric, the second high throughput receiver on the other side may use some of these channel properties for fast-start. Optionally, the active high throughput transmitter also forwards the channel properties to the second high throughput transmitter on the other side of the communication link.

In one embodiment, medium 620 comprises at least two wires, and the mode of operation is changed serially, first over one wire, and then over the other wire(s), such that at least a low throughput communication link is continuously maintained.

In one example, medium 620 is a CAT5e cable comprising 4 pairs of wires, and the communication link 600 is used for transferring HDMI and Ethernet streams over all of the wires. In full throughput mode, the communication link 600 transfers over each pair of wires 2 Gbps in a first direction and 250 Mbps in the opposite direction. Upon receiving a request to change the directionality, the first two pairs of wires continue to work as before and maintain the communication over the link. At that time, the second two pairs of wires switch to a new mode of operation. After the second two pairs of wires establish communication in the opposite direction, the first two pairs of wires switch to the new mode of operation. Optionally, the communication over the first two pairs reaches its full throughput in the opposite direction before the second two pairs of wires change directionality. Alternatively, the communication over the first two pairs reaches an intermediate throughput in the opposite direction before the second two pairs of wires change directionality.

Figure 7:
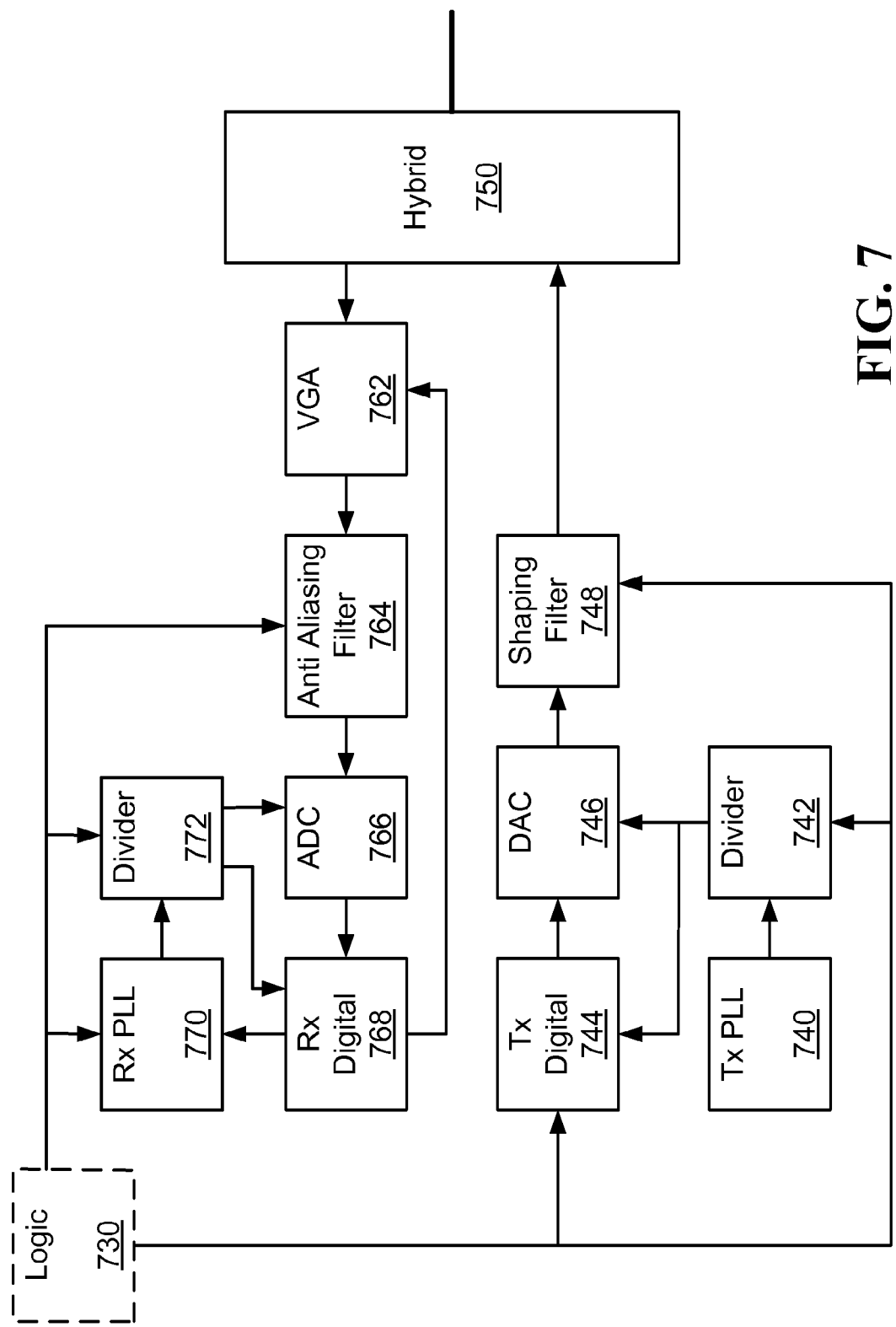
FIG. 7 illustrates an analog front end for an asymmetric communication link, in accordance with one embodiment of the present invention.

In one embodiment, an asymmetric communication link transmits in both directions over at least partially overlapping frequency bands. FIG. 7 is a schematic illustration of one example of an analog front end for such an asymmetric communication link.

The logic 730 controls the characteristics of the transmitting and the receiving paths. Referring to FIG. 7, the clock generated by the Tx PLL 740 is manipulated by the divider 742 according to the logic 730, and provided to the digital transmitter 744 and to the digital-to-analog converter 746. In one embodiment, the low throughput transmitter clock is derived from the recovered clock of the PLL of the high throughput receiver. In order to provide an asymmetric transmission, the logic 730 controls the mode of operation of the digital transmitter 744, the bandwidth of the shaping filter 748 according to the required symbol rate (i.e. the logic 730 determines the mode of operation of the shaping filter 748), and controls the transmission rate of the digital-to-analog converter 746 using the divider 742 or by duplicating the transmitter's 744 inputs as needed. The transmit and receive paths are coupled to a hybrid circuit 750 that is coupled to the communication medium.

In the receiving path, the hybrid circuit 750 is coupled to a variable gain amplifier 762 (VGA), which is coupled to an anti-aliasing filter 764, which is coupled to an analog-to-digital converter 766, which is coupled to the digital receiver 768. The logic 730 provides the receiving path controls that are coordinated with the controls provided to the transmitting path. According to the required mode of operation of the communication link, the logic 730 may control the mode of operation of the anti-aliasing filter 764, may control the receiver's clock rate through the divider 772, and may control the receiver's mode of operation. The digital receiver 768 may provide the Rx PLL 770 with clock correction in order to recover the received symbol clock, and may control the gain of the variable gain amplifier 762. The clock generated by the Rx PLL 770 is manipulated by the divider 772 according to the logic 730 and provided to the digital receiver 768 and to the analog-to-digital converter 766. Alternatively, Tx PLL 740 and Rx PLL 770 may be implemented by the same PLL coupled to one or more interpolators. In order to maintain the asymmetric channel, the transmitting path and the receiving path work in opposite modes, meaning that when the transmitting path operates in its high throughput mode, the receiving path operates in its low throughput mode, and vice versa.

Configurable Switch for Asymmetric Communication

In one embodiment, a switch for asymmetric devices comprises self-configurable asymmetric ports, wherein the self-configurable asymmetric ports are automatically configured according to the devices that are connected to them. This switch does not require the user to connect the sink and source devices to different ports.

In one embodiment, an idiot proof switch comprises multiple self-configurable asymmetric ports, wherein a user may connect cables to any appropriate self-configurable asymmetric port without worrying which port is designed for source devices and which port is designed for sink devices. FIG. 8C and FIG. 8D illustrate an idiot proof switch 820 having 5 self-configurable asymmetric ports, which enable a user to couple asymmetric sink and source devices to any of the self-configurable asymmetric ports. Moreover, there is no need to change any physical connection and/or to manually configure the switch in order to use one or more of the asymmetric devices coupled to switch 820.

In one embodiment, a device supporting daisy chain connection comprises self-configurable asymmetric ports, and therefore it does not matter to which of the ports the daisy chained devices are connected. I.e. there are no designated input or output ports for the device, just self-configurable asymmetric ports, so the user may connect the daisy chained devices to any of the ports.

In one embodiment, a multimedia network comprises edge devices having asymmetric communication ports coupled to at least one switch comprising self-configurable asymmetric ports that configure themselves according to the edge devices. Optionally, the switch also includes a symmetric port used for communicating with another switch.

In one embodiment, a multimedia switch includes a self-configurable asymmetric port that configures itself according to the edge device connected to it.

In one embodiment, a switch comprises at least two different types of ports. For example, a switch may comprise: (i) one or more symmetric communication ports and a plurality of asymmetric communication ports, (ii) one or more symmetric communication ports and a plurality of self-configurable asymmetric ports, (iii) a plurality of asymmetric communication ports and a plurality of self-configurable asymmetric ports, or (iv) one or more symmetric communication ports, one or more self-configurable asymmetric ports, and one or more asymmetric communication ports.

In one embodiment, a networking device comprising at least two asymmetric communication ports, wherein at least one of the asymmetric communication ports is a self-configurable asymmetric port; wherein the self-configurable asymmetric port is configured automatically and is able to support high throughput communication. Optionally, the self-configurable asymmetric port couples the networking device with a first end-device, and the networking device enables the first end-device to communicate with a second end-device coupled to another port of the networking device. Optionally, the networking device is a switch located at the user premises and supports high throughput communication over short to medium distances at a relatively low cost. Optionally, the switch is a wired switch that further comprising at least one symmetric port. Optionally, the switch is a wired switch and all of the ports are self-configurable asymmetric ports; whereby the switch is an idiot proof switch. Optionally, the networking device is a multimedia repeater or a daisy-chain device.

In one embodiment, a networking device comprising at least two self-configurable asymmetric ports; wherein the networking device is able to set automatically the direction of the self-configurable asymmetric ports according to the devices that are coupled to it. Optionally, the networking device is a daisy-chain device designed for uncompressed video applications and the self-configurable asymmetric ports are self-configurable wired asymmetric ports.

In one embodiment, a switch for uncompressed video comprising self-configurable asymmetric ports; the switch is adapted to set each of its self-configurable asymmetric ports automatically according to the directionality of the end-device coupled to the port. Optionally, the end-devices are selected from video source devices and video sink devices. Optionally, the uncompressed video is uncompressed high definition digital video. Optionally, the switch is a wired switch, and the asymmetric communication is transmitted over the same physical wires. Optionally, the switch further comprising a negotiation mode enabling the switch to learn the directionality of the end-devices coupled to its self-configurable asymmetric ports. Optionally, the switch is a part of a network, and further comprising a control function configured to change the network topology by changing the direction of the at least one self-configurable asymmetric port. Optionally, the control function is implemented in the switch or in a device that is coupled to the network. Optionally, most of the high bandwidth traffic comprises data related to video pixels and most of the low bandwidth video traffic comprises non video pixel data.

In one embodiment, an asymmetric switch comprising ports of one type, wherein each port can function as an asymmetric input port or as an asymmetric output port based on the characteristics of the device connected to it. Optionally, the asymmetric switch is a wired asymmetric switch, and the ports coupled to high throughput source devices function as asymmetric input ports. Optionally, the high throughput source device is a high definition video source device. Optionally, the asymmetric switch is a wired asymmetric switch, and the ports coupled to video sink devices function as asymmetric output ports.

Configuring an Asymmetric Link Based on Monitored Commands

When possible, it is usually beneficial to initialize the direction of the self-configurable asymmetric link according to the direction required for achieving an expected user command. The initial direction may be selected according to various methods, some of which are described below. In one embodiment, upon receiving a user command, the switch sets the link accordingly regardless of the number and the properties of the end-devices coupled to one or more of the switches.

Figure 8A:
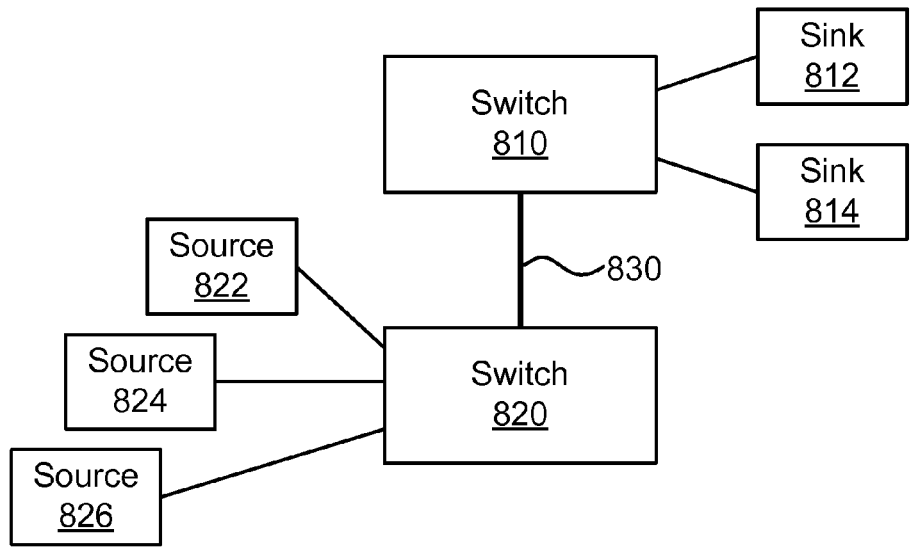
FIG. 8A and FIG. 8B illustrate end-devices coupled to an asymmetric network, in accordance with one embodiment of the present invention.

FIG. 8A illustrates an asymmetric network comprising switch 810 coupled to switch 820 through a self-configurable asymmetric link 830. Sink devices 812 and 814 are coupled to switch 810, while source devices 822, 824, and 826 are coupled to switch 820. In this case, it is obvious that the direction of the self-configurable asymmetric link 830 should be from switch 820 to switch 810, and optionally that direction is configured automatically.

Figure 8B:
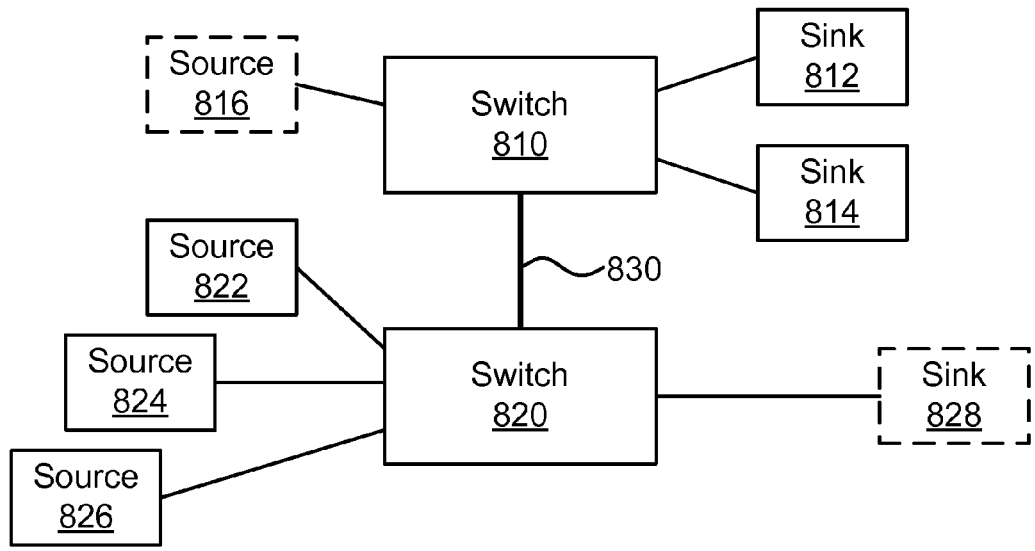
Figure 8C:
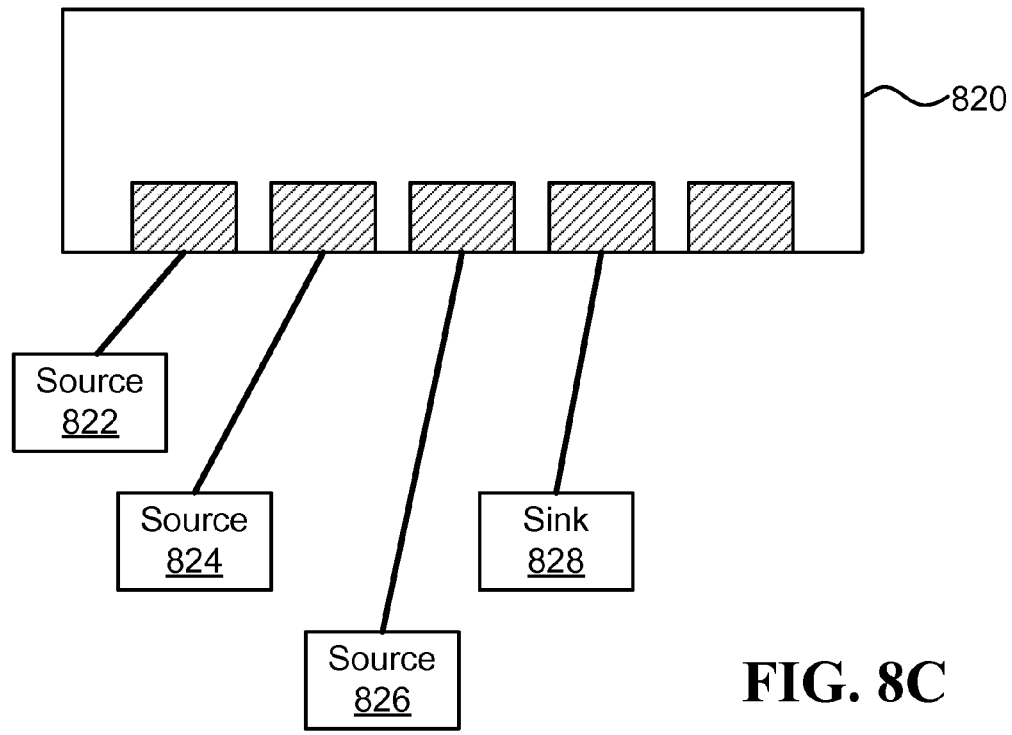
FIG. 8C and FIG. 8D illustrate an idiot proof switch having self-configurable asymmetric ports, in accordance with one embodiment of the present invention.
Figure 8D:
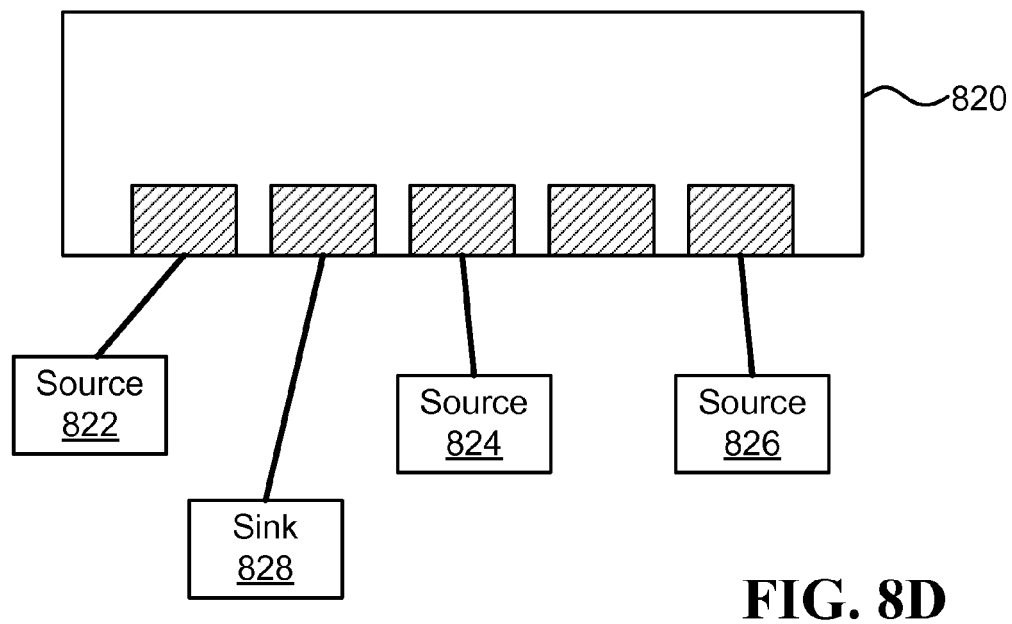

FIG. 8B illustrates the case where an additional source device 816 is coupled to switch 810 and an additional sink device 828 is coupled to switch 820. Therefore, the direction of the self-configurable asymmetric link 830 may be from 820 to 810, or from 810 to 820.

In one embodiment, the initial direction of the self-configurable asymmetric link 830 is determined based on the type and number of devices coupled to each switch, such that the selected direction maximizes the number of devices capable of communicating with one another, also referred to as accessible devices. For example, three sources and one sink are coupled to switch 820, while one source and two sinks are coupled to switch 810. Therefore, the direction of the self-configurable asymmetric link 830 is set to be from switch 820 to switch 810, thereby preferring communication between sources 822, 824, 826 and sinks 812, 814, over communication between source 816 and sink 828.

In one embodiment, the initial direction of the self-configurable asymmetric link 830 is determined based on the types and weights assigned to the various devices, such that the selected direction maximizes a predefined function. In a first example, source 822 is considered to be the most important source and as a result its assigned weight is equivalent to the weight of four regular sources. Therefore, the weighted equation is 6 sources on one side of the link against 1 source on the other side of the link, and the direction of the self-configurable asymmetric link 830 is set to be from switch 820 to switch 810. In a second example, source 816 is considered to be the most important source and as a result its assigned weight is equivalent to the weight of four regular sources. Therefore, the weighted equation is 3 sources on one side of the link against 4 sources on the other side of the link, and the direction of the self-configurable asymmetric link 830 is set to be from switch 810 to switch 820.

In one embodiment, the weights assigned to the various devices are selected based on prior usage statistics in order to select the more frequent network topology as the default topology. Still referring to FIG. 8B, in one example, assuming the user usually watches contents from source 816 on sink 828, although switch 820 is coupled to a larger amount of sources than switch 810, because of the prior statistics the self-configurable asymmetric link will be initialized to the direction from switch 810 to switch 820. In one embodiment, the usage statistics are measured by one or more of the switches. In a second embodiment, the usage statistics are measured by a control point. In a third embodiment, the usage statistics are gathered from one or more of the end-devices. In one embodiment, the usage statistics are measured by each port for itself.

In one embodiment, a networking device for uncompressed video comprising self-configurable asymmetric ports; the networking device is coupled to end-devices configured to use multimedia control messages to control their operation; wherein the networking device is operative to monitor the multimedia control messages transmitted through it and to set at least one of the self-configurable asymmetric ports accordingly. Optionally, the networking device is a wired switch, and the multimedia control messages are CEC messages. Optionally, the switch sets the self-configurable asymmetric ports automatically based on the monitored CEC commands. Optionally, the networking device is further operative to apply a stream migration operation based on the monitored multimedia control messages. Optionally, the networking device changes the network topology by setting the direction of the self-configurable asymmetric port. Optionally, the networking device is a multimedia repeater. Optionally, the networking device is a daisy-chain device. Optionally, the end-devices are selected from video source devices and video sink devices. Optionally, the networking device is a wired switch, and the uncompressed video is uncompressed high definition digital video. Optionally, the asymmetric communication is transmitted in full-duplex over the same wires. Optionally, the networking device further comprising a negotiation mode enabling the switch to learn/negotiate the directionality of the end-devices coupled to its self-configurable asymmetric ports.

In one embodiment, a method for setting a self-configurable asymmetric port, comprising: monitoring multimedia control messages exchanged with an end-device coupled to the self-configurable asymmetric port; identifying a multimedia control message that points to an activity requiring a different configuration of the port; and setting the self-configurable asymmetric port accordingly. Optionally, the multimedia control messages are CEC messages. Optionally, the method further comprising applying a stream migration operation based on the monitored multimedia control messages. Optionally, the method further comprising changing the network topology by setting the direction of the self-configurable asymmetric port. Optionally, the method further comprising learning the directionality of the end-device before setting the direction of the self-configurable asymmetric port. Optionally, the method further comprising changing at least some of the multimedia control messages for generating a required network view. In one embodiment, a wired switch for uncompressed video comprising self-configurable asymmetric ports; the switch is coupled to end-devices configured to use control messages to control their operation; wherein the switch is configured to monitor the control messages transmitted through it, configured to change at least some of the control messages transmitted through it, or create spoofed control messages, in order to generate a required network view, and configured to automatically set at least one of the self-configurable asymmetric ports according to the monitored control messages. Optionally, the switch changes the network topology by setting the directionality of the self-configurable asymmetric port. Optionally, the control messages are CEC messages, and the switch is further configured to apply a stream migration operation based on the monitored CEC messages. Optionally, the end-devices are selected from video source devices and video sink devices. Optionally, the uncompressed video is uncompressed high definition digital video. Optionally, the asymmetric communication is transmitted in full-duplex over the same wires. Optionally, the uncompressed video further comprising a negotiation mode enabling the switch to learn the directionality of the end-devices coupled to its self-configurable asymmetric ports.

In one embodiment, a network comprising two networking devices connected via a self-configurable asymmetric link; sink and source devices are coupled to the networking devices; and the networking devices are operative to determine the direction of the self-configurable asymmetric link based on the distribution of the various sink and source devices coupled to the networking devices. Optionally, the networking devices are wired switches designed for uncompressed video. Optionally, the default direction of the self-configurable asymmetric link maximizes the number of source devices that may be connected to a selected sink device. Optionally, the default direction of the self-configurable asymmetric link maximizes the number of available source devices and sink devices. Optionally, at least one of the networking devices is a wired router or a wired daisy-chain device.

In one embodiment, an uncompressed multimedia network comprising: a first networking device coupled to a second networking device via a self-configurable asymmetric link; wherein the direction of the self-configurable asymmetric link is determined based on the characteristics of the devices connected to the first and the second networking devices. Optionally, the networking devices are wired switches.

Figure 9:
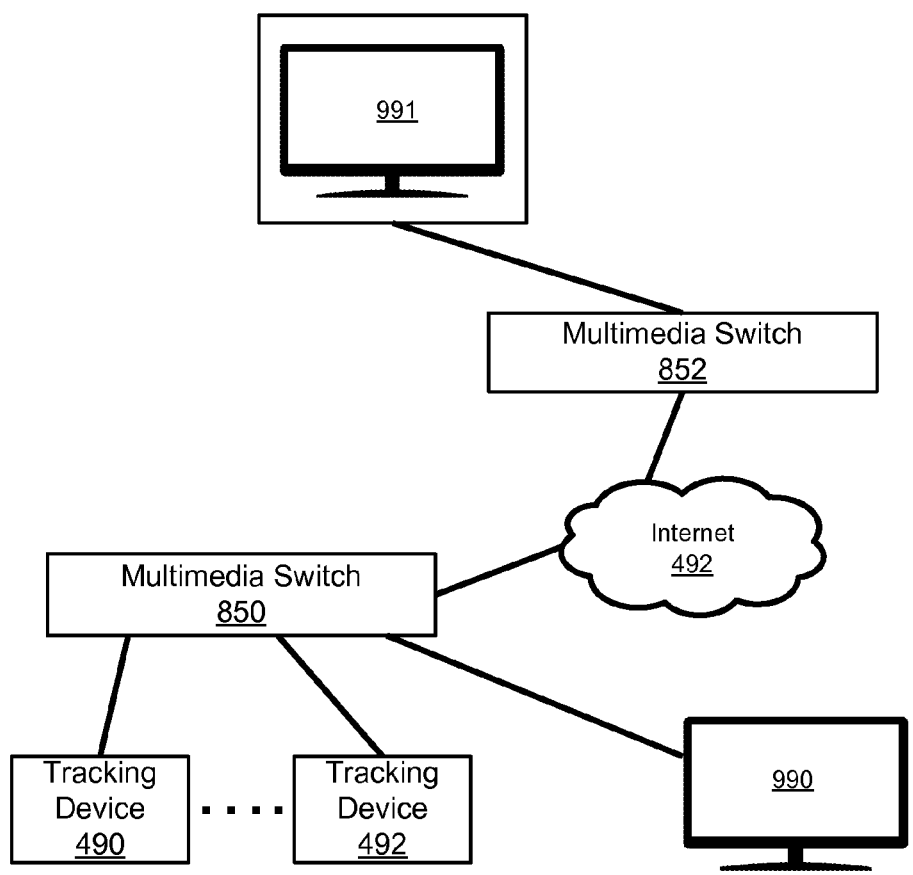
FIG. 9 illustrates one embodiment in which data about a user is recorded by tracking devices.

FIG. 9 illustrates one embodiment in which data about a user is recorded by tracking devices 490-492 such as one or more biometric sensors, webcam, GPS, smartphone, etc. The data is transmitted to a multimedia switch 850 that is connected to both a display device 990 and the Internet 492. Through the connection to the display device 990, the user can see his data, and optionally select a program, such as a personalized training program. Through the Internet connection, a distant user, such as the user's trainer or the user's family can receive a status report of the user. Optionally, the received status report is transmitted to a second switch 852 coupled to a television 991. By displaying the status report on the television 991, the user's family can be updated without having to take specific actions such as accessing www.facebook.com or other means.

In another embodiment, data measured by a smartphone is transmitted to the switch, which immediately displays it on the television.

What is claimed is:

1. A network comprising:
    a first networking device coupled to a first asymmetric communication end-device;
    the first networking device is connected via a self-configurable asymmetric link to a second networking device;
    the second networking device is coupled to a second asymmetric communication end-device;
    at least one of the networking devices is configured to receive properties of the first and second asymmetric communication end-devices, and is further configured to set direction of the self-configurable asymmetric link based on the properties of the first and second asymmetric communication end-devices.

2. The network of claim 1, wherein the self-configurable asymmetric link is a wired link designed to support uncompressed video.

3. The network of claim 1, wherein the self-configurable asymmetric link is a wireless link designed to support uncompressed video.

4. The network of claim 1, wherein the direction to which the self-configurable asymmetric link is set maximizes the number of asymmetric communication end-devices that can potentially be connected to a multimedia sink device.

5. The network of claim 1, wherein the direction to which the self-configurable asymmetric link is set maximizes the number of available asymmetric communication end-devices.

6. The network of claim 1, wherein at least one of the networking devices is a wired switch or a wired daisy-chain device.

7. The network of claim 1, wherein the direction of the self-configurable asymmetric link is set based on a weighted function of the asymmetric communication end-devices, whereby different end-devices may feature different weights.

8. The network of claim 7, wherein end-devices of the same type are weighted substantially the same.

9. The network of claim 7, wherein the weights are based on usage statistics.

10. The network of claim 1, wherein the set direction conforms with a most common network topology.

11. A method for setting direction of a self-configurable asymmetric link based on end-devices communicating via the self-configurable asymmetric link, comprising:
    obtaining a list of the end-devices communicating via the self-configurable asymmetric link; and
    setting the direction of the self-configurable asymmetric link to maximize a predefined function describing desired connections between the end-devices.

12. The method of claim 11, further comprising assigning weights to the end-devices; wherein the predefined function takes the weights into account.

13. The method of claim 12, further comprising monitoring usage statistics and assigning the weights based on the usage statistics.

14. The method of claim 11, wherein the end-devices comprise multimedia source and multimedia sink devices; and further comprising: selecting a multimedia sink device, and using the predefined function to maximize the number of multimedia source devices that may be connected to the selected multimedia sink device.

15. The method of claim 11, further comprising maximizing the number of available end-devices using the predefined function.

16. The method of claim 11, wherein the set direction conforms with a most common network topology.

17. A network comprising:
    a first networking device coupled to a first asymmetric communication end-device;
    the first networking device is connected via a self-configurable asymmetric link to a second networking device;
    the second networking device is coupled to a second asymmetric communication end-device;
    at least one of the networking devices is configured to receive usage statistics of the self-configurable asymmetric link by the first and second asymmetric communication end-devices; and the at least one of the networking devices is further configured to change direction of the self-configurable asymmetric link based on the usage statistics.

18. The network of claim 17, wherein the usage statistics are measured by at least one of the networking devices.

19. The network of claim 17, wherein the usage statistics are measured by a control point.

20. The network of claim 17, wherein the usage statistics are gathered from one or more of the asymmetric communication end-devices.

21. A method for setting direction of a self-configurable asymmetric link according to usage statistics, comprising:
   obtaining usage statistics of a network comprising multimedia end-devices coupled via two networking devices, wherein the networking devices are connected by a self-configurable asymmetric link; and
   changing the direction of the self-configurable asymmetric link based on the usage statistics of the network.

22. The method of claim 21, wherein the usage statistics are measured by at least one of the networking devices.

23. The method of claim 21, wherein the usage statistics are measured by the self-configurable asymmetric link.

24. The method of claim 21, wherein the usage statistics are obtained from a control point.

25. The method of claim 21, wherein the usage statistics are obtained from one or more of the end-devices.

* * * * *